April 12, 1966 C. T. JACOBS 3,246,253

VOLUME EXPANSION FOR AUDIO FREQUENCY AMPLIFIERS

Filed May 17, 1962 2 Sheets-Sheet 1

INVENTOR:

Charles T. Jacobs

April 12, 1966 C. T. JACOBS 3,246,253

VOLUME EXPANSION FOR AUDIO FREQUENCY AMPLIFIERS

Filed May 17, 1962 2 Sheets-Sheet 2

INVENTOR.

Chester T. Jacobs

United States Patent Office 3,246,253
Patented Apr. 12, 1966

3,246,253
VOLUME EXPANSION FOR AUDIO FREQUENCY AMPLIFIERS

Charles T. Jacobs, Box 362, Bernardsville, N.J.
Filed May 17, 1962, Ser. No. 195,629
10 Claims. (Cl. 330—152)

This invention relates to volume expansion for use in phonograph, radio and other systems in which the output sound is translated from electric oscillations. It has for its general object the provision of improved methods and apparatus whereby the amplitude ratios between successive components of the sound-representing electric oscillations may be automatically increased—typically, though not limitatively, for the purpose of counteracting the effect of contractions of those ratios which have been imposed in recordation or transmission.

Volume expansion is conventionally effected by varying the transmission factor of an oscillation-transmitting system, often but not necessarily an amplifier, in accordance with the level of the oscillations supplied to the system. One general category of expansion method and apparatus varies the gain of an electron-emission tube or other multi-electrode carrier-emission device (such as a transistor) by which the oscillations are being amplified, as by varying the potential of a control electrode therein. A second general category varies the value of an impedance which forms a load to which input oscillations are supplied with poor regulation (i.e., out of a portion of the system which itself has substantial output impedance) and from across which oscillations are taken off for further transmission; the so-varied impedance may comprise the path between two of the electrodes within an electron-emission tube or other multi-electrode carrier-emission device, in which case the variation may be accomplished by varying the potential of another or control electrode therein—but in this case such tube or other device performs the passive function of an impedance, as distinguished from the active (e.g., amplifying) function involved in the first category.

With either category the conventional manner of deriving the varying voltage which is to be applied to the control electrode is the creation of a rectified voltage generally corresponding to the envelope of the incoming oscillations—more specifically, rising in essentially complete correspondence (in rapidity as well as otherwise) to increases in the level of the incoming oscillations, but decreasing (when that level decreases) at a retarded rate.

The apparatus according to the present invention lies in the second category.

With either category the conventional manner of adjusting the degree of expansion is the adjustment of the ratio of the control voltage to the incoming-oscillation amplitude. Although effective this manner has an inherent disadvantage, not only in apparatus of the first category but also in that of the second when adjusted for less than the maximum available degree or expansion. This disadvantage is that any exceptionally or abnormally high-level input oscillations—which even well recorded or transmitted oscillations often unintendedly contain—will evoke an unnecessarily and unpleasantly large increase in level of the output oscillations and sound; the exposure to these increases tends to inhibit the use of all that degree of expansion which would otherwise be desired. There is known the use of a limiter for the control voltage and the adjustment of that limiter in correspondence with adjustment of the ratio mentioned above, but this involves considerable complication and is otherwise disadvantageous. According to one aspect of the present invention the inherent disadvantage just discussed is wholly obviated by employing, for the degree of expansion, not an adjustment of the ratio above discussed, but rather an adjustment of the degree to which the controlled impedance constituting the shunt or voltage-dividing-circuit portion affects the output oscillations.

When the control voltage is derived from the input oscillations, as is convenient and customary, it is of considerable importance that the level of those oscillations—more specifically, the level of their usual maxima, as distinguished from any exceptional or abnormal maximum such as discussed above be rather well controlled. To enable this control to be readily and dependably effected, it is customary to provide some form of amplitude-indicating device; a so-called "tuning eye" is frequently used as such a device. That, or almost any other inexpensive yet sensitive device, requires for its energization a rectified voltage having a predetermined ratio to the input-oscillation amplitude. According to the aspect of the present invention mentioned above the control voltage, having such a ratio to the input-oscillation amplitude in spite of various adjustments which may from time to time be made in the degree of expansion, is itself used as the rectified voltage for the indicating device.

The degree-of-expansion adjustment arrangements, for apparatus of either category, are conventionally so arranged that they increase the transmission factor in one or another degree when the incoming-oscillation amplitude is high, and leave it unincreased—but not reduced—when that amplitude is low. This results in a significant effect of the degree-of-expansion adjustment on the mean volume, thus normally imposing the burden of joint adjustment of degree of expansion and of volume (of the latter, at a position in the system subsequent to the expanding apparatus). It has been proposed to obviate this burden by interlinking with the degree-of-expansion adjustment a special additional compensating gain adjustment; though effective, this involves complication which serves no other useful purpose whatever. I have found that the aspect of the present invention mentioned above may readily be carried out in a manner which inherently obviates this burden.

Stating this aspect more specifically, the controlled impedance, together with its control by a voltage having a fixed ratio to input-oscillation amplitude, are arranged to produce a proper expansion effect at some selected maximum degree of expansion. For progressively lower degrees of expansion the controlled impedance is subjected to progressive reduction of its maximum value; this progressively reduces the transmission at high, but with little reduction of the transmission at low input amplitudes, from across the impedance. With this reduction, however, is coupled a progressive increase (for example, from a value of zero at the maximum-expansion adjustment) of transmission of oscillations which are at least substantially free of influence by the controlled impedance, this progressive increase therefore being essentially proportionate at all input amplitudes. The two sets of oscillations being additively combined, the net effect is a progressive reduction (though less than that of the first set of oscillations alone) at high, and a progressive increase at low, input amplitudes. It is obvious that when the progressive reduction and increase, respectively, have been carried to the point where only the second set of oscillations is being transmitted, all expansion will have been eliminated. On the other hand something which is not at all obvious, but which I have empirically discovered, is that the reduction and increase can readily be carried out in a manner which at each adjustment preserves almost perfect linearity, on a preselected basis such as a logarithmic one, of the expansions respectively effected at those adjustments over the whole range of input amplitudes.

As to the usually encountered disadvantage discussed in the fourth preceding paragraph, at any adjustment of the apparatus according to this aspect of the invention the limiting expansion is established by the maximum value of the controlled impedance; any attempt of abnormally high input-oscillation amplitudes to evoke more than that maximum expansion is inherently ineffective. As to the usually encountered burden discussed in the second preceding paragraph, the net transmission characteristics (plotted against input-oscillation amplitude) at the several adjustments according to this aspect of the invention all pass through one point or tiny region representing an essentially unchanged transmission of oscillations of an intermediate amplitude (such for example as 30% of the usual maximum), thereby inherently maintaining mean volume essentially unchanged.

In other areas there are several important desiderata to be simultaneously achieved in satisfactory volume-expanding apparatus, among which is (a) the avoidance of excessively high abrupt voltage impulses in the transmitted oscillations, which give rise to "thumps" in the output sound and to the production of which on sudden volume increases volume-expanding apparatus is notoriously prone. In such apparatus of either of the categories outline above such impulses arise from the sudden shift of D.C. current of the electron-emission or other carrier-emission device to whose control electrode there is applied the sudden shift of control voltage which, if the system is to operate realistically, must go with the sudden shift of input-oscillation amplitude; if that current must pass (as it conventionally does) through an external resistance of substantial fixed value, the abrupt voltage impulse is generated—ordinarily in such a circuit position that it unavoidably becomes a part of the transmitted oscillations.

Such desiderata, in particular in the case of apparatus of the second category, also include (b) the avoidance of a large increase of potential across the inter-electrode path comprised in the controlled impedance when that impedance is being driven to its higher values, resulting from decreased voltage drop then occurring across the element through which that path is being supplied with the current; the effects of such increase are not only to require much more control voltage but also otherwise to complicate the task of establishing a favorable relationship between that impedance and that control voltage. They further include (c) the establishment for the controlled impedance of a minimum value (from which a rise is to occur under the influence of the control voltage) at a modest rather than an itself-high value. They still further include (d) the use, also in order to facilitate the establishment of a favorable relationship between controlled impedance and control voltage, of a D.C. source of limited voltage (with an electron-emission tube, say of the order of 150 volts or less) yet of sufficiently good regulation so that the change of D.C. current drawn by the controlled impedance will not seriously alter that source voltage itself (which in the electron-tube case is difficult to do because the well regulated outputs of the D.C. source already available in the system are usually only of relatively high voltage, for example of the order of 300 volts).

For the achievement of desideratum (a) it has been conventional to resort to the expedient of a push-pull arrangement of the portion of the oscillation-transmitting system in which the expanding apparatus is located; then corresponding voltage impulses of the type mentioned in (a) are generated in each of two tubes or devices and by reason of the push-pull arrangement are, or at least should be, balanced or "bucked" out. To make the action as dependable as possible in spite of the magnitudes of the current impulses and an inability to rely on their precise equality, as well as to achieve desideratum (b), this expedient is conventionally carried out with a center-tapped transformer, or at least a center-tapped inductance, in the paths of D.C. supply to the tubes or other devices. The expedient meets desideratum (c) to the helpful extent of halving the impedance which a single tube or other device would present, since the impedances of the two tubes or other devices are effectively paralleled by the action of the tapped transformer primary or inductance. But the expedient, well carried out, involves the use of an iron-cored inductive device with its space, weight and cost disadvantages; it furthermore doubles the drain otherwise imposed by the volume-expanding apparatus on the current source; moreover it not merely fails to solve in any way the problem of achieving desideratum (d), but actually doubles the magnitude of the regulation phase of that problem—typically forcing resort to the additional expedient of incorporating in the source a voltage-regulator tube, entailing still further space, cost and current-drain disadvantages.

According to a second broad aspect of the present invention the several desiderata just discussed are nicely achieved by the use in the controlled impedance of two electron-emission or other carrier-emission devices—not in push-pull arrangement, but rather in an arrangement generally similar to that which, though for widely different purposes and performing basically different functions, is termed a "cascode" arrangement. As used in the invention, and in terms of electron-emission tubes, such an arrangement may be briefly described as comprising two tubes arranged for electron flow in respective paths between corresponding pairs of cathode and anode electrodes, and having respective grid electrodes whose potentials relative to the respective cathodes control the respective flows—the paths being connected in aiding D.C. series across the D.C. source, the grid of that tube whose cathode is at the junction of the paths being connected to the approximate mid-potential of the source, and the control voltage being applied between the grid and the cathode of the other tube. In this arrangement the junction of the two paths and the cathode of the second-mentioned tube then form the terminals (between which various values of fixed resistance may be connected to adjust the maximum available impedance) of the controlled impedance.

The arrangement achieves desideratum (a) because the "external" resistance through which the D.C. current of each tube or device must pass is constituted by the current path of the other, and that path has so varied in resistance as to obviate any first-order voltage shift at the path junction. The same action inherently achieves desideratum (b). The arrangement achieves desideratum (c) equally as well as does the push-pull arrangement, the A.C. impedances (so long as the A.C. impedance of the D.C. source be, as it ordinarily is, negligible) being effectively in parallel with each other. It does the foregoing without any use whatever of inductive devices; it furthermore does the foregoing without any doubling of current drain; moreover it at the same time completely achieves desideratum (d)—inherently, and without any resort to voltage-regulator tubes or other complicating devices.

A third aspect of the invention constitutes a refinement of the second broad aspect. In the "cascode" arrangement just broadly described the grid-to-cathode voltage of the first-mentioned of the two tubes or devices will approximate the control voltage (which itself is applied between grid and cathode of the second-mentioned tube or device). It is, strictly, the grid of the first-mentioned device whose voltage, in spite of control-voltage variation, is stabilized—at a mid-potential within the D.C. source—and it follows that the voltage at the inter-path junction will execute variations approximately inversely identical with those of the control voltage; to that limited extent abrupt voltage impulses will still be developed at the junction and will appear in the transmitted oscillations. Quantitatively (particular if high-mu tubes be employed as the two devices) their magnitudes will be small compared to those of the disturbing impulses commonly to be coped with in volume-expanding apparatus; it is obviously desirable, however, to annul even these remnant impulses if that can readily be done—which it can be in accordance with this third aspect of the invention. Briefly, and as will hereinafter appear in detail, this aspect consists in the application to the control electrode or grid of the first-mentioned device, when the control voltage abruptly changes, of an impulse which, transiently but in proper and sufficient manner to avoid the ultimate unfavorable effects, balances or "bucks" out the effect on the transmitted oscillations of the impulse otherwise generated at the inter-path junction.

Important objects of the invention have been made apparent by the foregoing summary description or statement of the invention. Allied and other objects will be apparent from the following detailed description and the appended claims.

In the detailed description of the invention hereinafter set forth reference is had to the accompanying drawings, in which:

FIGURE 1 is a schematic diagram illustrating a preferred embodiment of volume-expanding apparatus incorporating all three of the abovementioned aspects of the invention, in form appropriate to a single-channel (e.g., monophonic) oscillation-transmitting system;

FIGURE 1*a* is a schematic diagram illustrating additional apparatus by which the embodiment of FIGURE 1 may be adapted to dual-channel (e.g., stereophonic) use;

Figures 1, 1A, 2:
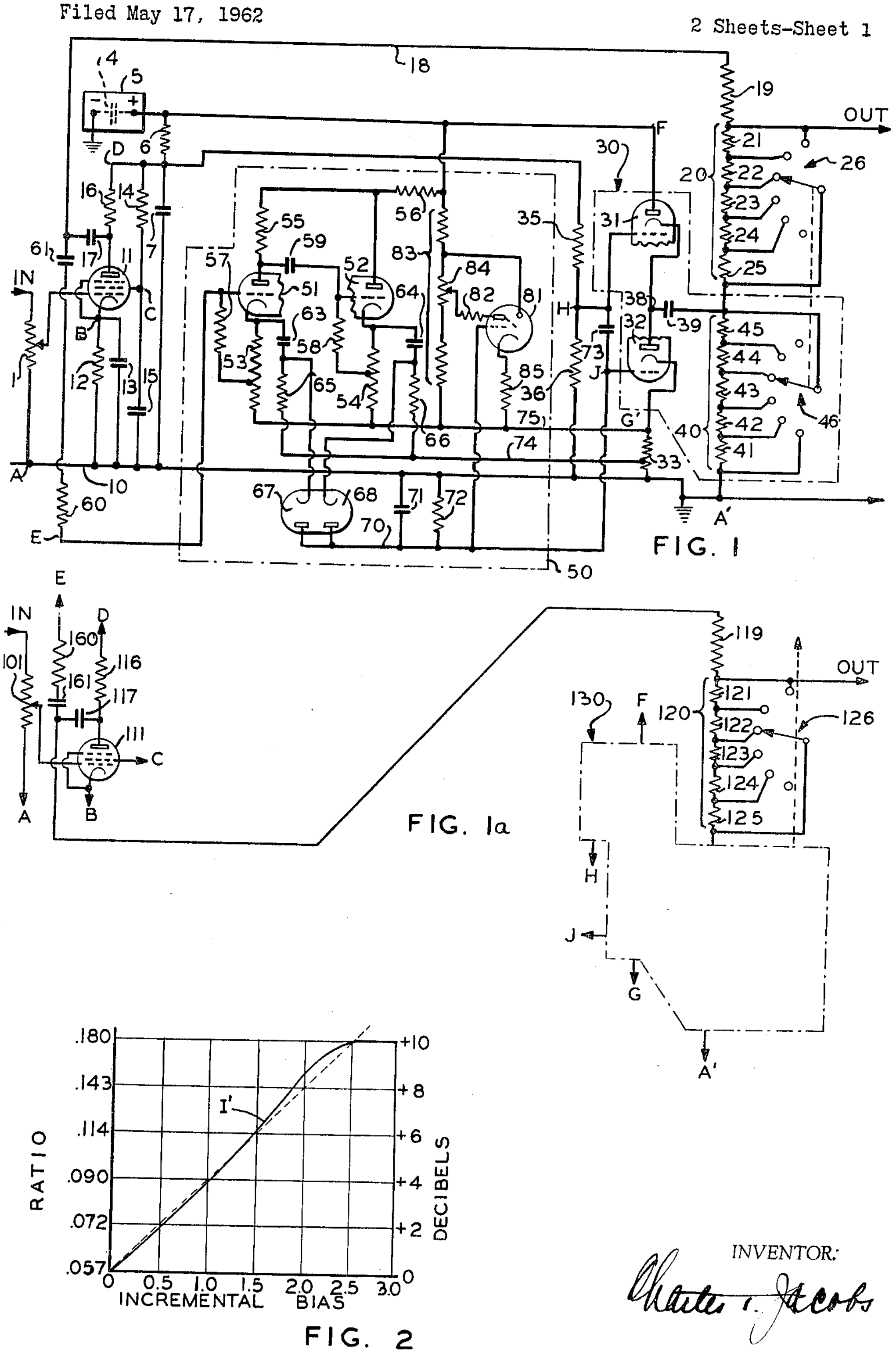
FIGURE 2 is a curve showing typical resistance and transmission characteristics of the controlled impedance and its associated circuit.

Reference being had to FIGURE 1, there will be seen an amplifying tube 11, typically of the pentode variety, forming a part of the oscillation-transmitting system with which the volume-expanding apparatus is associated. This tube may, for example, be arranged for self-bias by the resistor 12 and by-pass capacitor 13 connected between its cathode and conductor 10, whose potential may form a reference potential and may conveniently be termed "ground." Plate and screen currents may be supplied to the tube 11 from the positive terminal of the D.C. source 5 (whose negative terminal may be grounded and which has a low A.C. impedance indicated schematically by the dottedly-shown capacitor 4), preferably after first passing through a modest-valued filter resistor 6 whose output or non-source terminal may be by-passed to ground through the filter capacitor 7; from that output terminal current may pass to the screen through the screen-voltage-reducing resistor 14, the screen being by-passed to ground through the capacitor 15, and current may pass to the plate through the plate-feed resistor 16. The incoming oscillations, regulated in amplitude as by the potentiometer 1, may be impressed on the control grid of tube 11. The output oscillations from the plate of that tube may be impressed through a coupling capacitor 17 and a conductor 18 onto a load serially comprising a resistor 19, an adjustable resistance 20, and the controlled impedance—hereinafter more fully described—designated generally as 30. The output from the system may be taken off from across the serially arranged adjustable resistance 20 and controlled impedance 30.

In accordance with the second aspect of the invention, outlined above, the controlled impedance comprises two carrier-emission devices 31 and 32, which specifically in this embodiment may be mutually similar triodes preferably of high-mu variety. The carrier-flow paths of these devices are connected in D.C. series aiding with each other, by connection of the cathode of the first to the plate of the second, and the so-interconnected pair are connected across the D.C. source 5, by connection of the plate of 31 to the positive terminal of that source and connection of the cathode of device 32 to ground. The last-mentioned connection is desirably through a low-valued resistor 33 whose function is to devolop a minimum or initial bias voltage for the control electrode or grid of device 32, as hereinafter mentioned further. The control electrode or grid of device 31 is connected to the junction of two serially arranged equal-high-valued resistors 35 and 36 whose outer terminals may be connected respectively to the output terminal of the filter resistor 6 and to ground, that junction therefore representing the approximate mid-potential of the source 5.

It may be mentioned that the showing of 31 and 32 with the grid in each case below the cathode is simply for purposes of easier visualization of the action described hereinafter; it does not imply any special construction, and in each case the grid will in fact intervene between the cathode and the plate. The cathodes of the tubes already mentioned, as well as those of tubes yet to be mentioned, will of course be appropriately heated by means not necessary to show.

The D.C. current through the serially arranged devices 31 and 32 will be determined by the D.C. potential applied to the control electrode or grid of the device 32 relative to its cathode, and the action of the pair—connected as described, in a "cascode"-like arrangement—is such as to render the grid-to-cathode potential of the device 31 always essentially the same as that applied potential. The A.C. plate impedances, or A.C. impedances of the carrier-flow paths, of the two devices are functions of the respective potentials just mentioned; they are therefore always substantially similar to each other, and are jointly varied by the applied potential first mentioned in this paragraph. Looking between the junction 38 of the carrier-flow paths of 31–32 and ground (and for the moment neglecting any complicating effect of resistor 33) then, so long as the output impedance of the source 5 be negligible, one sees those A.C. impedances of the two devices as effectively in parallel with each other. Those impedances as thus seen form the basic portion of the controlled impedance according to the second aspect of the invention. The remaining portion of the controlled impedance is an adjustable resistance 40 which, by connection of its lower extremity to ground and of its upper extremity to the inter-path junction 38 through a D.C.-blocking capacitor 39, is placed in parallel relation to that basic portion. The above-mentioned connection of the controlled impedance as part of the serially arranged load 19–20–30 is accomplished by so connecting the adjustable resistance 40.

As will hereinafter more fully appear, the purpose of the adjustability of the resistance 40, and simultaneously of the resistance 20, is to permit the adjustment of the degree of expansion. It will be convenient first to consider the action of the apparatus with those resistances adjusted for maximum expansion—under which conditions 40 will have its maximum value and 20 a zero value.

Let there first be considered the pair of devices 31–32, with the control electrode or grid of 32 biased to an initial vaue at which substantial current flows in the devices but from which any appreciable increase will occasion an appreciable increase of each plate-cathode impedance. For those devices one may tabulate the approximate plate-cathode impedances at various values of additional or incremental bias. For example in the case wherein the devices form the respective sections of a 12BZ7 tube, operated from across a source 5 of approximately 300 volts (so that approximately 150 volts appears 12BZ7 tube, operated from across a source 5 of approximately 0.5 volt, the impedance of each may be very approximately 23,000 ohms with no incremental bias and 32,500 ohms, 50,000 ohms, 97,500 ohms, 275,000 ohms and approaching-infinity at incremental biases of 0.5, 1.0, 1.5, 2.0 and 2.5 volts, respectively. Except for a small effect caused by the presence of the resistor 33, the effective impedance of the pair of devices appearing between the junction 38 and ground at any incremental bias would of course be just half the value just mentioned. The actual effect of the resistor 33 (which is present in the grid circuit as well as in the plate circuit of 32) is to add, to the plate-cathode impedance of the device 32 only, an effective component slightly more than the product of its value by the mu of that device; if for example that resistor be of a little less than 50 ohms and that mu be 100 (as it is for a 12BZ7 tube), then approximately 5,000 ohms may be thus added. Now, taking the effect of the resistor into account, it may readily be determined that the effective device–31–32 impedance appearing between the junction 38 and ground may be approximately 12,600 ohms, 17,400 ohms, 26,200 ohms, 50,000 ohms, 139,000 ohms and approaching-infinity at incremental biases of 0, 0.5, 1.0, 1.5, 2.0 and 2.5 volts respectively.

If between the junction 38 and ground there be connected a fixed impedance—i.e., a parallel impedance, since it will be in parallel with the effective device–31–32 impedance—and oscillations from a zero-impedance source be supplied to that junction through a fixed series impedance, then the fraction of the source oscillations which will appear between the junction and ground will become a function of the incremental bias; furthermore the shape of the curve or characteristic of this function, plotted against incremental bias, may be subjected to considerable control by choice of the values of those parallel and series impedances. For example, a parallel impedance of 33,000 ohms and a series impedance of 150,000 ohms, taken with the device–31–32 impedance values last above tabulated, will result in fractions (of the source oscillations) appearing between junction 38 and ground equal to approximately .057, .071, .089, .117, .151 and .180 at incremental biases of 0, 0.5, 1.0, 1.5, 2.0 and 2.5 volts respectively. These values are shown, plotted against incremental bias, by curve I′ in FIGURE 2, here considered with its lefthand logarithmically arranged set of ordinates. The shape of curve I′, closely approximating an inclined straight line up to an incremental bias corresponding to the 2.5 volts mentioned above and therebeyond a flat straight line, is well suited to general-purpose expansion use, and it follows that the parallel and series resistance values (of 33,000 ohms and 150,000 ohms) on which its derivation was based are suitable values for use with the assumed pair of devices 31–32. It in turn follows that the maximum value of resistance 40, which of course forms the parallel impedance, may then be 33,000 ohms.

The fixed series impedance mentioned above is constituted by the sum of (i) the value ($r_{19}$) of resistor 19 and (ii) the paralleled value ($r_{16}'$) of the plate-feed resistor 16 and the output impedance of tube 11; the zero-impedance source mentioned above is the equivalent source provided by the tube 11 taken with its plate-feed resistor 16, which source in accordance with well - understood principles yields an output voltage of $e_g g_m r_{16}'$, wherein $e_g$ is the input-oscillation amplitude impressed on the grid of tube 11 and $g_m$ is the mutual conductance of that tube. That tube being of the pentode variety in FIGURE 1, its output impedance may be taken as a substantial part of a megohm; a value of 33,000 ohms is an appropriate one for the plate-feed resistor 16, and with it a value of 30,000 ohms may be taken as approximately correct for $r_{16}'$. Obviously in order to build the fixed series impedance up to the assumed 150,000 ohms, a value of 120,000 ohms is appropriate for $r_{19}$.

With the values above suggested, and assuming for tube 11 the readily realizable $g_m$ value of 2,500 micromhos, the equivalent-source voltage will be approximately $75e_g$, and the voltage developed across the controlled impedance will vary from approximately 4.28 $e_g$ at zero incremental bias to approximately 13.5 $e_g$ at 2.5 or more volts incremental bias. If arbitrarily the 4.3 $e_g$ be considered a reference, the developed voltage will vary from 0 to +10 decibels, as indicated by the righthand set of ordinates in FIGURE 2 (which are evenly spaced in view of the logarithmic arrangement of the lefthand ordinates). It may here be mentioned that while both the parallel and series impedances discussed above affect both the shape and the maximum/minimum spread of the curve I′, the former more vitally affects the shape and the latter more noticeably affects the spread; the choices made above are for the essentially inclined-straight-line shape and a spread of 10 db.

Before turning to the adjustment of the degree of expansion to less-than-maximum values (i.e., to the first mentioned broad aspect of the invention), it will be convenient first to describe the means by which the incremental bias is developed, as well as the input-oscillation amplitude-indicating device. These are principally comprised in a supplementary amplifier-rectifier indicator system 50. While the rectifier portion of this supplementary system may be of half-wave variety, full-wave is preferable and has been shown; while the amplifier portion may be of single-tube variety, a two-tube arrangement is preferable and has been shown.

This system 50 may comprise a pair of mutually similar triodes 51–52 (both if desired in a single envelope). The first is operated in dual fashion: (i) as a cathode-follower, to develop across its cathode resistor 53 a rectifiable voltage of one phase, and (ii) to develop at its plate a voltage phase-reversed from that at its grid, for application to the grid of the second. The second tube is operated simply as a cathode-follower, to develop across its cathode resistor 54 (of value similar to 53) a rectifiable voltage equal in amplitude to that across 53 but of opposite phase. To accomplish these objectives the tubes may be supplied with plate current from the source 5, if desired through a common voltage-reducing resistor 56; only the tube 51 need have a plate-feed or -load resistor, shown as 55. The tubes may have respective high-valued grid resistors 57 and 58 connected between there respective grids and points on their respective cathode resistors at which suitable D.C. biasing potentials are developed. A coupling capacitor 59 may couple the plate of the first tube to the grid of the second. By suitable choice of the value of the resistor 55 the A.C. currents through the respective tubes may be equalized, thereby achieving (i) the elimination from both the voltage-reducing resistor 56 and the source 5 of any net effect of those currents, and (ii) the above-mentioned equality of amplitude of the rectifiable voltages across 53 and 54.

To the grid of the tube 51 there will be applied a suitable oscillation voltage from the plate of the amplifying tube 11. This may be done via the coupling capacitor 17 above-mentioned, a D.C. block capacitor 61 connected to the non-plate side of 17, and a high-valued resistor 60 connected from 61 to that grid. Obviously the voltage appearing at that grid will be that fraction of the voltage at the plate of 11 which is represented by the ratio $$\frac{r_{57}}{r_{57}+r_{60}}$$

it is this voltage which, in somewhat attenuated but very-low-effective-impedance form, appears in two phases across the respective cathode resistors 53 and 54.

The oscillation voltages respectively appearing across 53 and 54 are impressed through respective D.C.-blocking capacitors 63 and 64 onto respective resistors 65 and 66. The D.C.-free voltage appearing across 65 is rectified by diode 67, whose cathode is connected to the junction of 63 and 65 and whose anode is connected to the conductor designated 70; the corresponding but opposite-phase voltage appearing across 66 is rectified by diode 68, whose cathode is connected to the junction of 64 and 66 and whose anode is also connected to the conductor 70, which thus receives both the rectified voltages alternately, or on a full-wave basis. Between this conductor and ground there is connected a storage capacitor 71, shunted by a high-valued resistor 72. The negative potential of the conductor 70 and its plate of the capacitor 71 follows with imperceptible delay all the increases which occur in the voltages across 65 and 66 and therefore all increases which occur in input-oscillation amplitude; the magnitude of that delay will be established by the effective output impedances of the cathode-follower tubes 51–52 and the actual impedances of the diodes 67–68, taken together and multiplied by the capacity of 71 (e.g., if that capacity be a fraction of a microfarad, that delay will be a fraction of a millisecond—subject to any desired increase by resistance interposed in conductor 70 between diodes and capacitor). On the other hand the rate at which the negative potential of the conductor 70 and its plate of the capacitor 71 will decrease in response to decreases of input-oscillation amplitude, being established by the RC product of that capacitor and the resistance of 72, will be relatively slow (e.g., a major part of a second).

The negative potential of the conductor 70 is the control voltage introductorily mentioned, the conductor being connected to the control electrode or grid of the device 32. The incremental bias is that same potential, less only the relatively negligible decrease of initial bias from across resistor 33 which occurs as a result of the increase of that potential occasioning a decrease of the device–31–32 current (discussed in the next paragraph). By suitable adjustment of the ratio between the values of resistors 57 and 60 the incremental bias may be caused to reach that magnitude (e.g., 2.5 volts) which will just drive the controlled impedance to its maximum value, at that input-oscillation peak amplitude on the grid of tube 11 which is considered a favorable maximum for proper amplifying operation of that tube; typically this may be a minor fraction of a volt.

In the absence of appropriate measures, the decrease of initial bias from across resistor 33 at higher incremental biases would not be negligible; it would in the limit reach the full magnitude (e.g., 0.5 volt) of the initial bias. It may, however, readily be limited to the order of only one-quarter that much by making the point of return (toward ground) of the cathode resistors 53–54, and that of the indicating-device components hereinafter described, a conductor 75 which leads to the ungrounded extremity of resistor 33. This causes the total flow through 33 to become predominantly a flow from the supplementary system 50, which does not reduce with increase of incremental bias—indeed, in which one component (the target-anode current of the tube 81 hereinafter mentioned) actually then increases slightly.

The point of return of the load resistors 65–66 was not specified above. While this point could be ground, that would leave the diodes 67–68 quite unbiased—whereas in order to annul the effect of "contact" potential in the diodes, which may occasion a very slight negative potential on conductor 70 in the absence of any input oscillations, a minute positive bias of the diode cathodes (relative to their plates) may be desirable; such a bias may readily be provided by returning the load resistors 65–66 through a conductor 74 to a suitable positive tap on resistor 33.

The remainder of the system 50 may comprise the indicating device, which may if desired be a tube of the sharp-cut-off "tuning eye" variety such as a 6E5. The plate of the triode incorporated therein may be supplied with current, through conventional high-valued resistor 82, from an intermediate D.C. voltage made available by a voltage-dividing network 83 between the positive of source 5 and conductor 75, to which latter the cathode of 81 may also be connected; if desired for close adjustment of maximum-indication point, 82 may be connected to the movable contact of a potentiometer 84 forming part of network 83. The grid of 81 will be connected simply to conductor 70, so that to that grid (relative to the tube's cathode) there is applied the incremental bias plus the initial bias. With such an indicator the most clear-cut indication is achieved when the voltage applied to its grid causes the shadow angle displayed by the tube to contract just to 0°, and the circuit constants may be so adjusted that this occurs at that incremental bias (e.g., 2.5 volts) which just drives the controlled impedance to its maximum value and which indicates the arrival of the input oscillations at their normal maximum amplitude. (With some values of plate and target voltages this value of incremental bias may not build up the total grid voltage quite enough to result in 0° shadow angle, in which event the total grid voltage may be modestly increased by a resistor 85 serially interposed in the connection of the cathode of 81 to conductor 75.)

It may be mentioned that the supply to the supplementary system 50 of oscillations from the plate of tube 11 (where their level is several-tens-of-times $e_g$) enables concentration in that system on and achievement of stringent minimization of the impedances out of which diodes 67–68 are fed—of real importance for ultimate abruptness of incremental-bias increase—with no dilution of that effort or its effectiveness in order to provide amplification in the system 50. At the same time, although the oscillation voltage at that plate is necessarily somewhat affected by the value of the controlled impedance, the choice of values (including that of resistor 19) indicated above, while preserving substantial net gain in the main system, at the same time limits the effect on that voltage to a wholly negligible 3%—and moreover that effect is an increase at higher controlled-impedance values, and thus in such a direction as to tend toward counteraction of the also-negligible diminution of incremental bias at higher controlled-impedance values, mentioned above.

Still assuming the maximum-expansion adjustment (resistance 40 its maximum of 33,000 ohms, resistance 20 zero) the operation of the typical system above described is as follows: With input oscillations of the maximum amplitude normal to the material (recording, broadcast-station reception or the like) being reproduced, the input-oscillation amplitude will be adjusted by potentiometer 1 so that the indicating device (e.g., 81) will indicate maximum; by reason of previous adjustment (permanent at least for a particular tube 81) this maximum indication will indicate the development of an approximate 2.5-volt incremental bias. The controlled impedance 30 will then have its maximum value and across it will be developed an oscillation voltage, or output of the overall system, of some 13.5 $e_g$. If then the input-oscillation amplitude in the material being reproduced decreases, the incremental-bias developed will reduce—though more gradually (timewise) than the oscillation-amplitude decrease, in accordance with established volume-expansion practice. If the reduction be to an infinitesimal amplitude, the controlled impedance will reach its minimum value and across it will be developed an oscillation voltage, or output from the system, of some 4.28 $e_g$; 10 decibels of reduction of transmission factor, or gain, of the system will have occurred. If now from the reduced amplitude the input-oscillation amplitude increases, no matter how abruptly, the gain will rise with so nearly the same abruptness that no physiological segregation of overall effect of the translated sound into amplitude-increase and gain-increase parts is feasible. In either direction the magnitude of the change in decibels will be essentially proportional to the numerical fraction of normal maximum by which the input oscillation amplitude has changed.

As was brought out introductorily above, the voltage at the inter-path junction 38 will in the absence of counteractive measures execute variations approximately inversely identical with those of the incremental bias of the control electrode of device 32—i.e., when that negative bias increases the potential of that junction will increase positively but otherwise correspondingly—and to that extent an abrupt positive voltage impulse may be developed at the junction when (as very often desiredly happens) the incremental bias increases abruptly. I have observed that since the junction potential is determined by reference to the potential of the control electrode or grid of the device 31, the application to the latter electrode of a negative but otherwise corresponding impulse will balance or "buck" out the abrupt positive impulse—and that such a negative impulse, so long as the devices 31 and 32 are truly similar to each other as they should be, would be one identical with the change of incremental bias. In accordance with the third aspect of the invention a negative impulse essentially identical with the change of incremental bias is applied to the control electrode of the device 31 by the simple expedient of connecting a capactitor 73 between the control electrodes or grids of the two devices 31 and 32. For maximum effectivness of this expedient the resistors 35 and 36 should be of high value, so that the RC product of the resistance which they together would have if in parallel with each other by the capacity of 73 will be an appreciable fraction of a second (though preferably less than the RC product of 71 and 72). It is true that the balancing out is transient only, and that in response to a change of incremental bias the potential of the control electrode of 31 must and will ultimately shift; this shift, however has now been made to occur at the retarded rate determined by the abovementioned RC product of 35–36 and 73, rather than abruptly as would have been uniquely dictated by the incremental bias in the absence of 73. The result is the essential elimination of even a remnant abrupt voltage impulse from the transmitted or output oscillations. Though not indispensable when the devices 31 and 32 are high-mu tubes, the expedient is nevertheless advantageous with them—and assumes increasing importance as the mu of those tubes decreases or for any other reason the devices 31 and 32 require higher incremental bias on 31.

The behavior of the system at full-expansion adjustment having been thus detailed, attention may now be turned to the reduction of the degree of expansion, to which the first broad aspect of the invention is directed. As introductorily brought out, this is accomplished by a reduction of the degree to which the controlled impedance 30 affects the output oscillations—specifically by a reduction of the maximum value of that impedance, coupled with an increase of the transmission of oscillations which are at least substantially free of influence by the controlled impedance. That reduction may be effected simply by reducing the value of the adjustable resistance 40; that increase may be effected simply by increasing the value of the adjustable resistance 20.

It is to be appreciated that such a reduction of maximum value of the controlled impedance will have a sharp effect on oscillations of and near normal maximum amplitude and on the other hand a negligible influence on those of very small amplitude, and in turn that such an increase of the transmission of oscillations from across the resistance 20 will provide a second set of oscillations which at all amplitudes are quite proportional to one another. It is clearly in no sense obvious that the addition of the two sets of oscillations would result in an output in which there would be preserved, at different degrees of expansion, any predetermined shape of expansion characteristic (i.e., characteristic such as shown for maximum expansion by curve I' of FIGURE 2). I have discovered, however, that the addition of the two sets does result in an output in which there is preserved the predetermined shape—e.g., essential linearity—of the maximum-expansion characteristic already dealt with. It is independently to be appreciated that the availability of this general approach to expansion-degree adjustment rests upon the acceptance of an increase of low-amplitude-oscillation output and a reduction of high-amplitude-oscillation output as degree of expansion is reduced, and vice versa, thus tending toward a substantial constancy of transmission of oscillations of some intermediate amplitude at all degree-of-expansion adjustments. I have found that such intermediate-amplitude constancy—which for reasons initially brought out is actually an inherent advantage—may indeed be used as a convenient reference for determination of the appropriate quantitative relationships between the resistances 20 and 40 for different degrees of expansion.

In accordance with the foregoing I have found it desirable to determine upon 30% of normal maximum amplitude as the intermediate oscillation amplitude to be maintained essentially constant at all degree-of-expansion adjustments; this, usually representing a little less than average volume of the transmitted material, is a psychologically desirable choice in order that an expansion-increasing adjustment shall not too often have even the temporary effect of seeming to reduce output volume (and vice versa), and is otherwise a satisfactory choice. Using this as a mean or reference oscillation amplitude, one observes that at the maximum-expansion adjustment oscillations of infinitesimal amplitude are transmitted with essentially 3 db less, and those of normal maximum (or greater) amplitude with essentially 7 db more, gain. This is portrayed by curve I in FIGURE 3, which will be recognized as a curve identical with curve I' of FIGURE 2 excepting (i) that the decibel ordinates have been uniformly decreased by 3 db and (ii) that the abscissae are alternatively stated in terms of percentage of normal maximum amplitude rather than the thereto-essentially-proportionate incremental bias.

In the determinations of the values of resistances 40 and 20 for less-than-maximum degrees of expansion the formula to be used is the expression which states the fraction of the equivalent-zero-impedance-source oscillations appearing across the serial combination of resistance 20 and the controlled impedance 30, which expression is $$\frac{(r_{20}+r_{30})}{(r_{16}'+r_{19})+(r_{20}+r_{30})}$$

Under any conditions the value of $r_{30}$ is of course the parallel value of resistance 40 and the impedance presented by devices 31–32 between junction 38 and ground. At infinitesimal and normal-maximum oscillation amplitudes the respective values of that impedance were above noted as 12,600 ohms and essentially infinity; at the mean oscillation amplitude (e.g., with 0.75-volt incremental bias) that impedance is typically about 21,200 ohms. In the above expression use of an $r_{20}$ value of 0, and of $r_{30}$ values equal to these values in parallel with 33,000 ohms (which resistance 40 is at maximum-expansion adjustment), yields fractions of .057, .0793 and .180 respectively—these being values portrayed by curve I' and thus by curve I. The middle one of these fractions, being for the mean (30%) amplitude, is the one which is to be kept essentially constant at all degree-of-expansion adjustments and therefore is to be used in the determinations. Actually, since curve I intersects the 30% abscissa at about −⅙th db rather than at precisely 0 db, it is preferable to use for the middle fraction a figure of some .0803, which would correct for this; at maximum-expansion adjustment this .0803 would be achieved by an ideal $r_{30}$ value of 13,100 ohms (it being recalled that $r_{16}'+r_{19}$ is constant at 150,000 ohms).

Let it be desired to determine the values of resistances 40 and 20 appropriate to an expansion of say three-fifths of that effected at the maximum-expansion adjustment—i.e., an expansion which at infinitesimal oscillation amplitudes is 1.8 db less, and at normal maximum amplitude is 4.2 db more, than at the mean oscillation amplitude.

As above noted the value of the expression at the mean amplitude should be .0803, and it is readily determined that at infinitesimal and normal-maximum amplitudes it should ideally be .0652 and .1302 respectively. In a first attempt to achieve these values let it arbitrarily be assumed that resistance 40, which obviously must be reduced in some degree, should be reduced to 22,000 ohms. This in parallel with the 21,200 ohms presented by the devices 31–32 at mean amplitude represents an $r_{30}$ of some 10,800 ohms; necessarily the value of resistance 20 would then have to be 2,300 ohms in order to maintain the mean-amplitude 13,100-ohm value of $r_{20}+r_{30}$. If now with 22,000 ohms for resistance 40 $r_{30}$ be calculated at infinitesimal oscillation amplitude it will be found to be some 8,010 ohms, and of course at maximum amplitude it is the 22,000 ohms. With these $r_{30}$ values and the 2,300-ohm $r_{20}$ value, it is readily determined that the values of the above expression at infinitesimal and maximum oscillation amplitudes are some .0643 and .1393 respectively—the former being only about .1 db less than the desired .0652, but the latter being about .6 db greater than the desired .1302. If now the calculation process be repeated with an assumed value of 20,000 (instead of 22,000) ohms for resistance 40, it will readily lead to 2,850 ohms for $r_{20}$ and to respective expression values of .0659 and .1322—each within .15 db of the desired values. For the three-fifths-of-full expansion case, therefor, the preferred values of 40 and 20 may be approximately 20,000 ohms and 2,300 ohms, respectively.

Corresponding calculations for one-, two- and four-fifths of full expansion readily complete a set of preferred values as follows:

| For— | $r_{40}$, ohms | $r_{20}$, ohms |
|---|---|---|
| Four-fifths of maximum expansion | 26,000 | 1,420 |
| Three-fifths of maximum expansion | 20,000 | 2,300 |
| Two-fifths of maximum expansion | 14,000 | 4,670 |
| One-fifth of maximum expansion | 9,000 | 6,780 |
| Zero expansion | 0 | 13,100 |

None of these values is critical, as the above typical calculations as to the three-fifths case have inherently demonstrated. None of them involves an error at either the infinitesimal or normal-maximum amplitudes of more than a wholly negligible .15 db and all are inherently rigorous at mean amplitude. And while it has of course not been mathematically demonstrated above, it may readily be shown that the errors at other percentages of normal maximum amplitude are less than those implicit in the wholly acceptable maximum-expansion characteristic.

FIGURE 1 illustrates means for adjusting the values of resistances 40 and 20 to achieve the foregoing. Thus the resistance 40 may be made up of serially arranged resistors 41 (shown at the bottom) of 9,000 ohms, 42 of 5,000 ohms, 43 of 6,000 ohms, 44 of 6,000 ohms and 45 of 7,000 ohms; establishment of its actual value in circuit may be effected by a switch 46 arranged to short out none (for maximum-expansion) or one, two, three, four or all five of those resistors, starting with 45. Likewise the resistance 20 may be made up of serially arranged resistors 21 (shown at the top) of 1,420 ohms, 22 of 880 ohms, 23 of 2,370 ohms, 24 of 2,110 ohms and 25 of 6,320 ohms; establishment of its actual value in circuit may be effected by a switch 26 arranged to short out all five (for maximum-expansion adjustment) or four, three, two, one or none of those resistors so as to bring the remaining one or ones, if any and starting with 21, into circuit—the switch 26 being mechanically interlinked with the switch 46 for simultaneous adjustment.

Figure 3:
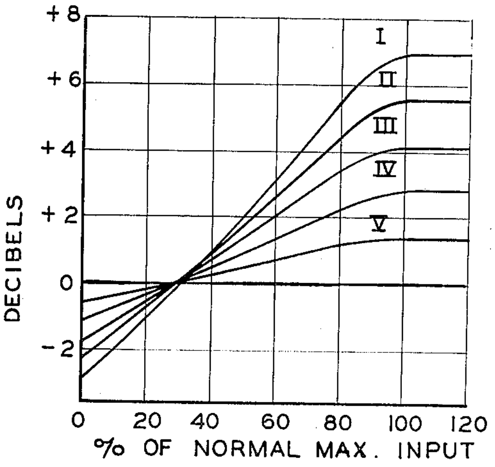
FIGURE 3 is a set of curves showing typical characteristics of volume-expanding apparatus according to the invention.

FIGURE 3, in addition to curve I for the maximum-expansion case, shows as II, III, IV and V the curves for the four-fifths, three-fifths, two-fifths and one-fifth cases. It will readily be observed that the curves, all passing through a single tiny region at the mean (30%) oscillation-amplitude point, inherently preserve a substantial constancy of gain or transmission at that mean level. Furthermore all the curves flatten off at the normal-maximum oscillation amplitude, so that at no adjustment of the degree of expansion can exceptionally or abnormally high-level input oscillations (i.e., of over the 100%) evoke excessive output-oscillation amplitudes; furthermore this is achieved inherently, without control-voltage limiters or the like. Moreover there have been avoided excessively high abrupt voltage impulses in the transmitted oscillations and thus "thumps" in the output sound, the controlled impedance has been held to a modest minimum value, and a favorable relationship (witness the curves of FIGURE 3) of it to the control voltage has been established; all this has been done without the use of inductive devices, voltage-regulator tubes or other disadvantageous devices.

FIGURE 1 has disclosed the volume-expanding apparatus applied to a single oscillation-transmitting channel. An elaboration of the apparatus is readily possible to accomodate it to dual-channel—e.g., stereophonic—use, and a typical one is illustrated in FIGURE 1*a*. This elaboration comprises a second channel in which there are duplicated, by elements in each instance numeralled 100 higher than in FIGURE 1, various elements of FIGURE 1; thus there will be seen the input potentiometer 101, the amplifying tube 111 with its plate-feed resistor 116 and coupling capacitor 117, the load resistor 119 and adjustable resistance 120, and the controlled impedance 130 (of which the component portions, though all duplicated, are not re-detailed), as well as the blocking capacitor 161 and resistor 160 for coupling of the amplifying tube of the second channel to the amplifier-rectifier indicator system 50 of FIGURE 1—but no duplication of that supplementary system itself is necessary. Various points in FIGURE 1 are indicated by respective letters, and to those respective points it will be understood that there will be connected the various points in FIGURE 1*a* from which there lead similarly designated arrows; thus at A and A' the grounds of the two channels are interconnected, at points B, C and D the cathodes, screen grids and plate feeds of the tubes 11 and 111 are respectively interconnected, and at F, G, H and J corresponding points in the controlled impedances 30 and 130 are interconnected. (It will of course be understood that these interconnections will call for reduction of the values of various components in FIGURE 1, among which are the filter resistor 6, cathode resistor 12, screen resistor 14 and bias resistor 33.) The movable contacts of the potentiometers 1 and 101 will be mechanically interlinked with each other, and the switch 126 (and switch 146, not shown, of the controlled impedance 130) will be mechanically interlinked with the switches 26 and 46.

With the two channels interconnected as thus described, and with each of the resistors 60 and 160 having twice the value which 60 would have in the single-channel case, the oscillation voltage supplied to the supplementary system 50 will be a mean or average voltage from the two channels, and the controlled-impedance values and thus the expansions in the two channels will each be controlled by that average. This is wholly acceptable and in no discernible way whatever (so long as the values of resistors 60 and 160 be kept high, as they will be when that of 57 is moderately high) harmful to the stereophonic effect.

Figure 4:
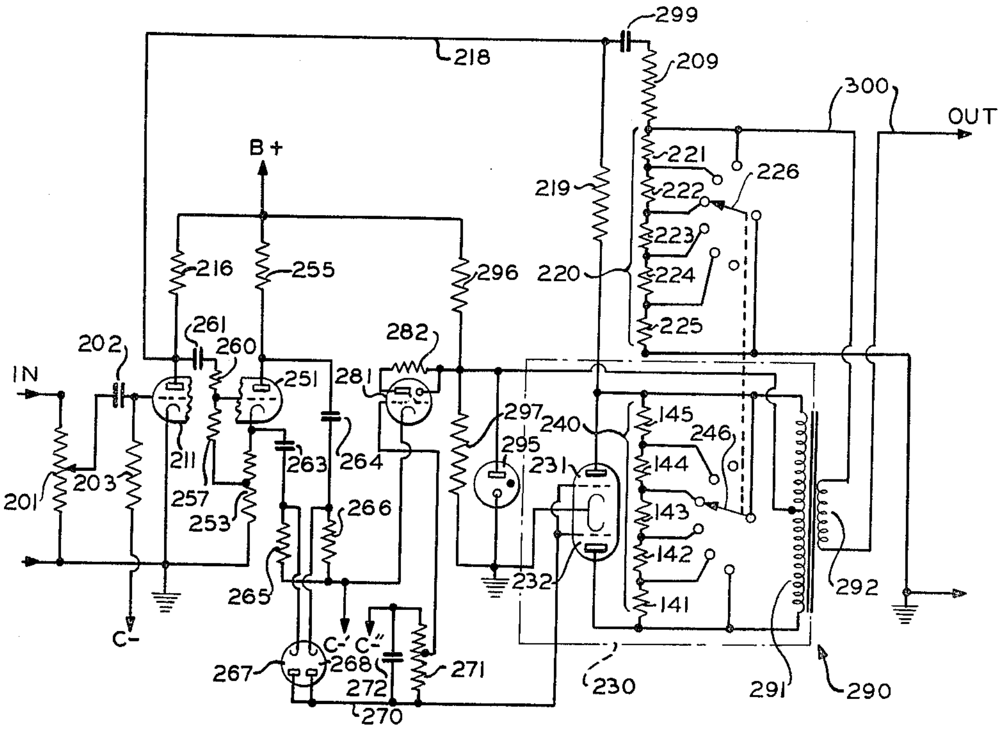
FIGURE 4 is a schematic diagram illustrating an embodiment of volume-expanding apparatus incorporating the first, but not the second or third, of the abovementioned aspects of the invention.

It is to be understood that the first broad aspect of the invention is not limited to use without inductive devices, voltage-regulator tubes or the like—whose incorporation may under some circumstances not be considered too great a burden—and that it is equally capable of performing its various worthwhile functions (though not those of the second and third aspects) when such devices are used. FIGURE 4 accordingly illustrates an embodiment in which such devices are present, and in which various specific matters are handled in manners differing from those employed in the system of FIGURE 1. In this embodiment the amplifying tube 211 may for example be a triode (typically of a mu of 20), fixedly biased through grid resistor 203 (for example from a voltage derived from the entire plate current of the overall amplifier of which FIGURE 4 may form a part) and supplied with plate current through the plate-feed resistor 216. Input oscillations, regulated in amplitude as by the potentiometer 201, may be impressed through the blocking capacitor 202 onto the grid of the tube 211; the output oscillations from the plate of that tube may be impressed through the conductor 218 onto a split or parallel-branch load hereinafter described.

The controlled impedance, designated as 230, includes two mutually similar triode tubes 231 and 232 of medium mu, shown in a single envelope, for which I have satisfactorily employed the respective sections of a 7AF7 tube (having a mu of 16). The cathodes of these tubes may be grounded, and their plates may be connected to the respective outer extremities of the center-tapped primary 291 of a transformer 290; a medium D.C. voltage (e.g., of 150 volts) is applied to the center-tap of the primary 291, preferably from across a grounded-cathode voltage-regulator tube 295 which is suitably connected by series and parallel resistors 296 and 297 to the source of higher B voltage. The voltage-regulator tube 295 inherently presents an essentially zero impedance (to A.C.) across its terminals, and it follows that A.C.-wise the center tap of primary 291 is effectively grounded. In turn, by reason of the auto-transformer action of the primary, there appears between either of its outer terminals (for example, the upper-shown one) and ground the plate impedances of tubes 231 and 232 effectively in parallel with each other. These paralleled impedances, in turn effectively paralleled by an adjustable resistance equal to one-quarter the value of an adjustable resistance 240 actually connected across the entire primary, constitute in this embodiment the controlled impedance. Its value at any adjustment of the resistance 240 is of course a function of the voltages applied to the grids of the tubes 231 and 232, which are made identical to each other by interconnection of those grids and whose unitary value is the control voltage.

With the 7AF7 tube mentioned above and with an adjustment of the resistance 240 to an actual value of 60,000 ohms, I have found the value of the controlled impedance 230 to be approximately 3,750 ohms at a 6-volt bias on the grids of 231–232 or, if 6 volts be considered the initial bias, at an incremental bias of 0 volts, and the values of that impedance at incremental biases of about 2.05 volts, 4.1 volts, 6.15 volts and 8.2 volts respectively to be very approximately 5,250 ohms, 7,500 ohms, 11,250 ohms and 15,000 ohms.

One branch of the split load of tube 211 may be constituted by a resistor 219, connected between the plate of tube 211 and the upper terminal of primary 291, and the controlled impedance 230 in series with each other. Accordingly across the controlled impedance will be impressed oscillations of amplitude equal to $$\frac{r_{230}}{r_{219}+r_{230}}$$

times the amplitude actually developed at the plate of tube 211. With these oscillations there may be additively combined oscillations essentially unmodified by variations of the value of the controlled impedance; such essentially unmodified oscillations may be developed across an adjustable resistance 220. As an alternative to the serial arrangement of 20 and 30 shown in FIGURE 1, FIGURE 4 shows the adjustable resistance 220 connected in the second branch of the split load of tube 211—i.e., with one extremity grounded and the other connected through a resistor 209 (and a blocking capacitor 299) to the plate of tube 211, the elements 209 and 220 thus forming the second branch. Obviously across the adjustable resistance 220 will be impressed oscillations of amplitude equal to $$\frac{r_{220}}{r_{209}+r_{220}}$$

times the amplitude actually developed at the plate of tube 211. The combining of oscillations from across the variable impedance 230 and the adjustable resistance 220 may be achieved by connecting the secondary 292 of the transformer 290 serially in an output conductor 300 leading from the ungrounded extremity of resistance 220.

The combined or total output-oscillation amplitude will then be the oscillation amplitude actually developed at the plate of tube 211 multiplied by the fractional-valued expression:

$$\frac{Nr_{230}}{r_{219}+r_{230}}+\frac{r_{220}}{r_{209}+r_{220}}$$

wherein N represents the turns ratio between the secondary 292 and half of the primary 291.

The triode tube 211 may be operated with a plate impedance of the order of 10,000 ohms and a load resistor 216 for example of 22,000 ohms, to develop an oscillation voltage at its plate (in the absence of the load 219–230–209–220) of about 13.8 $e_g$; this is the voltage of the equivalent zero-impedance source in series with which is an effective resistance of about 6,900 ohms (the parallel value of the above 10,000 and 22,000 ohms) and which feeds directly into the split load. Calculations in this case would be complicated by the split nature of the load, were it not for the fact that in a useful embodiment the net load impedance will vary little (with either control voltage or expansion adjustment) from about 27,000 ohms, so that the oscillation amplitude actually developed at the plate of tube 211 may be considered essentially constant at about 11 $e_g$ and the expression last presented above becomes readily usable. That useful embodiment is one in which resistors 219 and 209 are each 50,000 ohms; for its calculations may be carried out in the broad manner indicated above for the FIGURE 1 embodiment but of course using the specific expression last presented. Such calculations, taking N as 8/7, yield a set of values for the resistors (241 through 245, starting at the bottom) of which resistance 240 is composed of 13,400 ohms, 9,600 ohms, 10,200 ohms, 11,800 ohms and 15,000 ohms respectively, and a set of values for the resistors (221 through 225, starting at the top) of which resistance 220 is composed of 548 ohms, 672 ohms, 835 ohms, 1,225 ohms and 3,170 ohms respectively. Again the values, although stated to three or four significant places, are in actuality not at all critical. Again interlinked switches, here designated as 246 and 226, may of course be used in analogy to FIGURE 1 to adjust the values of resistances 240 and 220.

With the component choices above indicated there may be obtained a set of expansion characteristics almost identical to those of FIGURE 3 (actually with a maximum-expansion spread of about 10.5 rather than 10 db); of course the incremental bias requirements are higher (e.g., about 8.2 volts at normal maximum input) and the abscissae of FIGURE 3 must therefore for this case be multiplied by about 3.3.

While the supplementary amplifier-rectifier-indicator system of FIGURE 4 might conform to the design of that of FIGURE 1, it is by way of alternative example illustrated as comprising a single triode 251 operated as a phase-splitter; this, failing to provide on one of its phases (i.e., at its plate) the low effective output impedance that it does on the other phase (i.e., at its cathode), is to that extent not as desirable as the two-tube arrangement of FIGURE 1 but is nevertheless quite operative. The triode 251 may have a cathode resistor 253 and a plate-feed resistor 255 across which it develops similar-amplitude but opposite-phase output voltages (each necessarily somewhat less than the voltage at its grid); it may have a high-valued grid resistor 257 connected between its grid and a point on its cathode resistor at which a suitable D.C. biasing potential is developed. To the grid of the triode 251 there will be applied a suitable oscillation voltage from the plate of the amplifying tube 211, through blocking capacitor 261 and a high-valued resistor 260. From the cathode and plate respectively the developed oscillations may be applied through respective blocking capacitors 263 and 264 onto respective load resistors 265 and 266, and the opposite-phase voltages across these resistors may be rectified and impressed in rectified form on conductor 270 by respective diodes 267 and 268 in analogy to FIGURE 1. Between conductor 270 and a potential negative relative to ground, designated C—″ and equal to the initial bias required for tubes 231–232, there may be connected a storage capacitor 271 shunted by a high-valued resistor 272, respectively analogous to 71 and 72 of FIGURE 1. The load resistors 265 and 266 may be returned to a potential negative relative to ground, designated as C—′ and preferably a few tenths of a volt less negative than C—″. The conductor 270, across which the control voltage is developed, is connected directly to the grids of the tubes 231 and 232.

The indicating means in FIGURE 4 may be a "tuning eye" tube 281 similar to 81 of FIGURE 1; its triode plate may for example be connected through high-valued resistor 282, and its target anode may be connected directly, to the ungrounded terminal of the voltage-regulating tube 295. With the greater control voltage required for the medimum-mu triode 231 and 232 the conductor-270 voltage will be excessive for application to the grid of the indicator tube 281, which may therefore be connected to an appropriate tap on the resistor 271.

The general operation of the system of FIGURE 4, being largely analogous to that of the FIGURE 1 system, need not be redetailed. It may, however, be pointed out that in this case the avoidance of the development of abrupt voltage impulses in the transmitted oscillations—specifically, in those appearing across the secondary 292—is accomplished by mutual cancellation in the primary 291 of the abrupt current changes produced in tubes 231 and 232 upon abrupt change of the control voltage.

It will be understood that in the use of any of the embodiments of my invention the level of the incoming oscillations will desirably be adjusted by the abovementioned input potentiometer or potentiometers to the normal-maximum reference discussed above, and that establishment of the actual level of the output sound from the overall system is preferably to be accomplished by suitable potentiometric or other volume-control means (not shown) located in a subsequent position in that system. When such means are of the tone-compensated variety such as disclosed in U.S. Patent No. 1,938,256 to me, the constancy of normal-maximum amplitude of the oscillations supplied to them, resulting from the appropriate use of the input potentiometer or potentiometers and as indicated by the indicating device, nicely preserves the intended action of the tone compensation.

While I have disclosed my invention in terms of particular embodiments thereof, it will be understood that I thereby intend no unnecessary limitations. Modifications in many respects will be suggested by my disclosure to those skilled in the art, and such modifications will not necessarily constitute departures from the spirit of the invention or from its scope, which I undertake to define in the following claims. In those claims I use the term "input-representing oscillations" to include oscillations which may be altered (e.g., increased) in amplitude relative to, but which are in all other respects substantially identical with, the actual incoming oscillations.

I claim:

1. In audio-frequency volume expansion by the variation, under the influence of a D.C. control voltage derived from input-representing oscillations, of an impedance to which input-representing oscillations are supplied with poor regulation and from across which oscillations are taken off and are additively combined with input-representing oscillations essentially free of influence by variations of said impedance to form the output oscillations, the method of altering in a given sense the degree of the expansion without other essential change of the expansion characteristic which comprises changing in said given sense the maximum value of said impedance and changing in the opposite sense the amplitude of said lastmentioned input-representing oscillations.

2. In the volume expansion of incoming audio-frequency oscillations whose amplitudes vary throughout a range from zero up to a normal maximum, by the variation, under the influence of a D.C. control voltage derived from input-representing oscillations, of an impedance to which input-representing oscillations are supplied with poor regulation and from across which oscillations are taken off and are additively combined with input-representing oscillations essentially free of influence by variations of said impedance to form the output oscillations, the method of altering in a given sense the degree of the expansion without other essential change of the expansion characteristic which comprises changing in said given sense the maximum value of said impedance thereby to change in said given sense the amplitude of said oscillations taken off from thereacross, and changing in the opposite sense the amplitude of said lastmentioned input-representing oscillations, while maintaining approximately constant the amplitude of said additively combined oscillations for incoming oscillations of an intermediate amplitude.

3. The subject matter claimed in claim 2 wherein said intermediate amplitude is less than half of said normal maximum amplitude.

4. The subject matter claimed in claim 2 wherein said intermediate amplitude is of the order of 30% of said normal maximum amplitude.

5. In combination in an audio-frequency oscillation-transmitting system: means actuated by audio-frequency input-representing oscillations for developing a D.C. control voltage which is a function of those oscillations; a controlled impedance connected with said voltage-developing means, comprising an electric circuit whose impedance is a function of said control voltage; an impedance of substantial magnitude in series with said controlled impedance, said two impedances being operatively connected with the input of the system for traversal by input-representing oscillations; means, operatively connected with the input of the system, across which there appear input-representing oscillations essentially free of influence by variations of said controlled impedance; and means connected with said last-recited means and with said controlled impedance for additively combining and transmitting oscillations from across both.

6. The subject matter claimed in claim 5 wherein said means across which there appear input-representing oscillations is serially comprised in and forms a part of said impedance of substantial magnitude.

7. The subject matter claimed in claim 5 further including means for adjusting the maximum impedance value of said controlled impedance and means for adjusting the amplitude of said last-referred-to input-representing oscillations, said two adjusting means being interlinked to adjust said value and said amplitude oppositely to each other.

8. The subject matter claimea in claim 5 wherein said electric circuit comprises carrier-emission means to which said control voltage is applied and wherein said controlled impedance further comprises a resistance in shunt to said carrier-emission means, further including means for adjusting the value of said shunt resistance and means for adjusting the amplitude of said last-referred-to input-representing oscillations, said two adjusting means being interlinked to adjust said value and said amplitude oppositely to each other.

9. In combination with an audio-frequency oscillation-transmitting system having a substantial output impedance: means actuated by audio-frequency input-representing oscillations for developing a D.C. control voltage which is a function of those oscillations; a D.C. source of low A.C. impedance; two carrier-emission devices each having a carrier-emitting electrode, an emission-receiving electrode and a control electrode, and means connecting said devices in cascode across said source, including means establishing the control electrode of a first of said devices at a potential intermediate the terminal potentials of said source; means applying said control voltage to the control electrode of the other of said devices; means connecting the junction of said devices and a terminal of said source across said oscillation-transmitting system to render the path between said junction and said terminal an output load controlled by audio-frequency input-representing oscillations; and means effective upon an abrupt change of said control voltage applied to the control electrode of said other device for impressing on the control electrode of said first device a transient but otherwise substantially similar voltage change.

10. The subject matter claimed in claim 9 wherein said means establishing the control electrode of a first of said devices at an intermediate potential is of high impedance, and wherein said voltage-impressing means comprises a capacitor connected between the control electrodes of said devices.

References Cited by the Examiner

UNITED STATES PATENTS

| | | | |
|---|---|---|---|
| 2,144,039 | 1/1939 | Whiteley | 330—145 X |
| 2,488,410 | 11/1949 | Keizer | 330—145 X |
| 2,801,300 | 7/1957 | Crane et al. | 330—85 X |
| 2,845,574 | 7/1958 | Shapiro | 330—70 X |
| 2,948,860 | 8/1960 | Affelder | 333—14 X |
| 3,041,545 | 6/1962 | Studebaker | 330—128 |

ROY LAKE, *Primary Examiner.*

BENNETT G. MILLER, NATHAN KAUFMAN, *Examiners.*

T. M. WEBSTER, *Assistant Examiner.*